Figure 1:
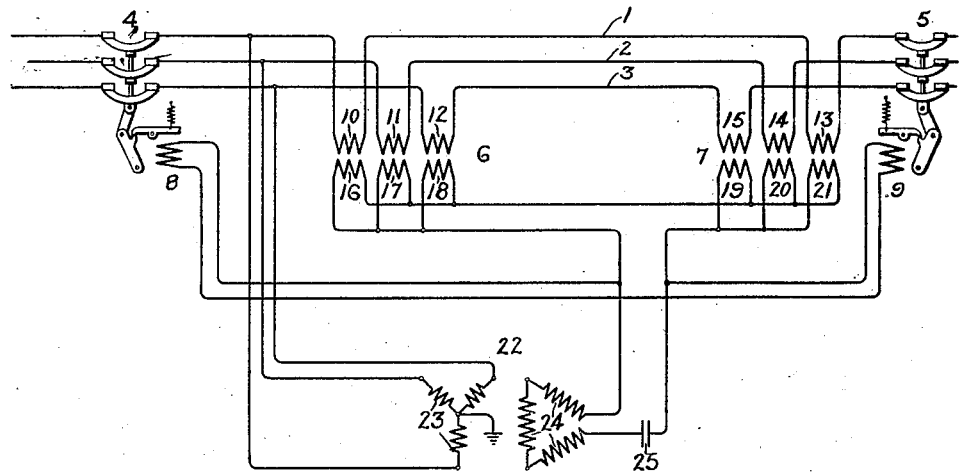

Oct. 18, 1927.

C. P. STEINMETZ 1,646,265

PROTECTIVE SYSTEM

Filed July 24, 1924

Inventor:
Charles P. Steinmetz, Deceased;
Joseph L. R. Hayden, Executor;
by
His Attorney.

Patented Oct. 18, 1927.

1,646,265

UNITED STATES PATENT OFFICE.

CHARLES P. STEINMETZ, DECEASED, LATE OF SCHENECTADY, NEW YORK, BY JOSEPH L. R. HAYDEN, OF SCHENECTADY, NEW YORK, EXECUTOR, ASSIGNOR TO GENERAL ELECTRIC COMPANY, A CORPORATION OF NEW YORK.

PROTECTIVE SYSTEM.

Application filed July 24, 1924. Serial No. 728,020.

This invention relates to the protection of electric power systems comprising a plurality of feeder or transmission circuits, and has for its object the provision of an improved protective system which will operate in a reliable manner to isolate a faulty power circuit without disturbing the connections of the normal circuits in the power system.

It is highly desirable that a faulty circuit in a power feeder or transmission system be isolated promptly without disturbing the connections of the associated normal circuits. Various protective systems have been proposed for this purpose. The invention will be explained with reference to protective systems which depend for their operation upon the relative values of the energy transmitted through opposite ends of the circuit to be protected. When the energy supplied to one end of the circuit is the same as that delivered at its opposite end, the relays or switch trip coils controlling the connections of the circuit are unenergized and the energy in the circuit is said to be balanced. If the circuit becomes grounded, however, the energy which it transmits is no longer balanced due to the fact that current lagging behind the system voltage is fed into the fault. Under these conditions the relays controlling the connections of the circuit are energized to isolate it from the rest of the system.

Certain difficulties have been encountered in the operation of the balanced energy system due to the capacity currents which are supplied to the normal circuits of the system when the system voltage is unbalanced. Thus, in the case of a ground on one of the system circuits, the system voltage is unbalanced and an increase in the charging current of each of the normal sections is produced. These charging currents lead the system voltage in phase, and traverse but one end of the circuit. They are therefore apt to produce sufficient energy unbalance in a circuit to cause it to be isolated from the system when it is not at fault. This difficulty may of course be avoided by decreasing the sensitivity of the circuit relays but, in some cases, the required decrease in sensitivity is so great as to preclude proper operation of the relays. In accordance with the present invention means responsive to the charging currents fed into a normal circuit when the system voltage is unbalanced due to a ground elsewhere on the system are provided for neutralizing the effect of these currents upon the circuit relays, or switch coils.

The invention will be better understood from the following description when considered in connection with the accompanying drawing and its scope will be pointed out in the appended claims.

Figure 2:
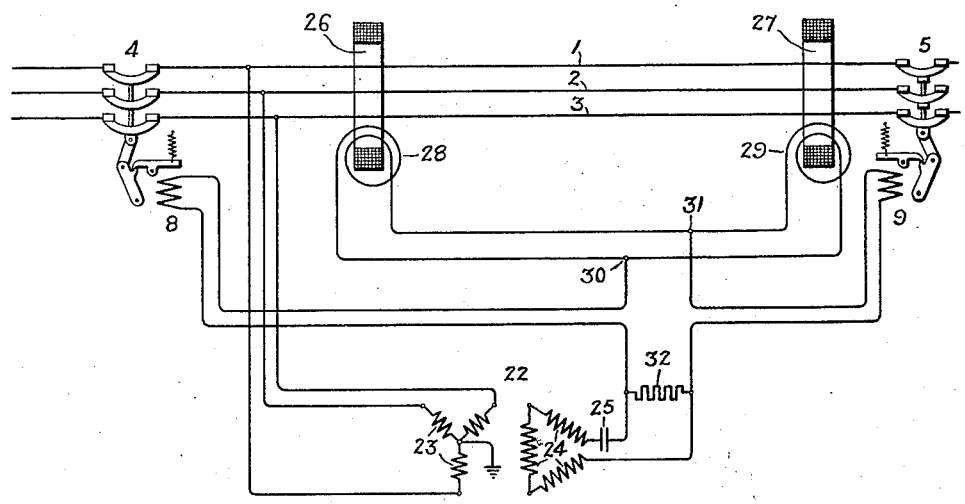

Referring to the drawing, Fig. 1 shows the invention as applied to a balanced energy protective system; and Fig. 2 shows its use in connection with a balanced energy system which differs from that of Fig. 1 in certain of its details.

Fig. 1 shows a polyphase power circuit which comprises conductors 1, 2 and 3 and is provided with switches 4 and 5 for connecting it to the other circuits of the system. A balanced energy protective system comprising current transformer groups 6 and 7 and trip coils 8 and 9 of the switches 4 and 5 respectively is provided for isolating the circuit in case it becomes faulty. The primary windings 10, 11 and 12 of transformer group 6 are connected in series with conductors 1, 2 and 3 respectively at the left hand end of the circuit. The primary windings 13, 14 and 15 of the transformer group 7 are likewise associated with these conductors at the right hand end of the circuit. The secondary windings 16, 17 and 18 of transformer group 6 are shown as connected in parallel to the pilot circuit and are arranged to impress on this circuit, when the outgoing and return currents in the lines 1, 2 and 3 are unequal, a resultant voltage which is opposed to that impressed on it by the secondary windings 19, 20 and 21 of transformer group 7 under these conditions. When the resultant voltages of transformer groups 6 and 7 are equal the voltage impressed on the pilot circuit is zero and the trip coils 8 and 9 are not energized. This condition will, of course, obtain only when the energy transmitted through the two ends of the circuit is the same. If a fault occurs either on the section comprising lines 1, 2 and 3 or on another section connected with this section, lagging current is fed into the faulty section and the system voltage is unbalanced. Under these conditions the energy transmitted through opposite ends of the sections is unbalanced. In the faulty section this unbalance is due to the fact that current is fed into the fault. In the normal sections this unbalance is due to the fact that the charging current of each of these sections is changed in value. It is, of course, desirable to disconnect the section which is at fault and this is readily accomplished by the difference between the resultant voltages of the transformer groups 6 and 7 which is impressed on the trip coils 8 and 9 under these conditions. It is undesirable, however, to disconnect the normal circuits.

As previously indicated, the protective system just described is incapable of distinguishing between the current unbalance which results from a ground on the circuit and that produced by unbalance in the system voltage due to a ground elsewhere on the system. In order to overcome this defect, a transformer group 22 comprising potential transformers having their primary windings 23 connected between the ground and the three-phase circuit is provided. The secondary windings 24 of these potential transformers are connected in series with a condenser 25 and this series circuit is connected to the pilot circuit in parallel with the trip coils 8 and 9.

It will be apparent that each primary winding 23 has impressed upon it a voltage which is the same as that between one of the power circuit conductors and the ground, and that the resultant of these voltages will be zero only when the system voltages are balanced. When the system voltages are unbalanced due to a ground on one of its phases, the resultant voltage has a value which is dependent upon the amount of unbalance. This resultant voltage will appear at the terminals of the series-connected secondary windings 24 and may be utilized to produce a resultant current proportional in value to the current produced in the pilot wire circuit by the unbalanced charging currents of the power circuit. The connections are such that the resultant voltage impressed upon the trip coils 8 and 9 is the difference between the resultant voltage of group 22 and that of groups 6 and 7. In order to bring the currents produced by these two voltages into the proper phase relationship, a condenser of a capacity approximately equal to that of the power circuit is connected in series with the windings 24. With these connections, the resultant current traversing the trip coils when unbalanced charging currents are supplied to the power circuit will be zero. When the circuit becomes faulty, however, the current supplied to it lags behind the system voltage, the currents supplied from the current and potential transformers no longer neutralize one another, and a resultant current is supplied to the coils 8 and 9. The relays or trip coils used to operate the circuit switches, therefore, may be made as sensitive as desired without danger of isolating a normal circuit in response to a fault elsewhere on the system and without in anywise decreasing their sensitivity to faults on the circuit which they protect.

The transformer groups 6 and 7 may be arranged to impress on the pilot circuit voltages which assist each other instead of oppose each other when the outgoing and return currents in the lines 1, 2 and 3 are unequal. Under such a condition current will then circulate in the pilot circuit and the trip coils 8 and 9 will in such case be connected to equipotential points in the pilot circuit. With such connections the transformer secondaries 24 should be shunted by a resistance. This arrangement of connections is shown at Fig. 2.

In Fig. 2 the equipotential points of the pilot circuit, to which the trip coils are connected, are indicated at 30 and 31 and the resistance across the transformer secondary windings 24 and condenser 25 is shown at 32. Fig. 2 further differs from Fig. 1 in that the transformer groups 6 and 7 of Fig. 1 are replaced by the transformer cores 26 and 27 provided respectively with the secondary windings 28 and 29 connected to the pilot circuit. In this arrangement the line conductors 1, 2 and 3 themselves act as the primary of each of the transformers having the secondary windings 28 and 29.

With the circulating current connections of Fig. 2, with normal conditions throughout the circuit, no voltage is induced in the secondary windings 28 and 29. If a fault occurs elsewhere on the system such that the outgoing and return currents in the conductors 1, 2 and 3 are unequal, current will circulate through the pilot circuit, but if it were not for the capacity current produced by the unbalanced line voltage such circulating currents would have no tendency to operate trip coils 8 and 9 since the points 30 and 31 would be equipotential points. Since, however, the capacity current of the section of the line between the transformers affects one transformer and not the other, the transformer group 22 is connected to neutralize the effect of such capacity current, as in the arrangement of Fig. 1, so that the points 30 and 31 remain equipotential points. Whenever, however, a ground occurs within the section of the circuit between the transformers, the equipotentiality of the points 30 and 31 is destroyed and the difference of the current in the secondary windings 28 and 29 operates the trip coils 8 and 9.

The invention has been explained by illustrating and describing certain specific embodiments thereof, but it will be readily understood by those skilled in the art that it may be embodied in other forms than those shown and described. The invention should therefore not be restricted to the particular forms of construction disclosed herein by way of example for the purpose of setting forth the invention in accordance with the patent statutes. The terms of the appended claims are, therefore, not restricted to the precise structure disclosed, but are intended to cover all changes and modifications within the true spirit and scope of the invention.

What is claimed as new and desired to be secured by Letters Patent of the United States, is:—

1. A power circuit, and a protective system comprising a pilot circuit for controlling the connections of said power circuit, transformers associated with opposite ends of said power circuit for supplying to said pilot circuit current of a value dependent upon the relative values of the energy transmitted through opposite ends of said power circuit, and means interconnecting said power and pilot circuits for supplying a neutralizing current to said pilot circuit when unbalanced charging currents are supplied to said power circuit.

2. A power circuit, and a protective system comprising a pilot circuit for controlling the connections of said power circuit, groups of current transformers associated with opposite ends of said power circuit for supplying to said pilot circuit a resultant current of a value dependent on the relative values of the energy transmitteed through opposite ends of said power circuit, a condenser, and potential transformers interconnecting said power circuit with said pilot circuit through said condenser for supplying a neutralizing current to said pilot circuit when unbalanced charging currents are supplied to said power circuit.

3. A power circuit, and a protective system wherein means associated with said power circuit are arranged to impress upon a pilot circuit for controlling the connections of said power circuit a resultant voltage of a value dependent upon the energy transmitted through opposite ends of said power circuit, characterized by the fact that means comprising a group of potential transformers are provided for impressing a neutralizing voltage on said pilot circuit when unbalanced charging currents are supplied to said power circuits.

In witness whereof, I have hereunto set my hand this 23rd day of July 1924.

JOSEPH L. R. HAYDEN,
*Executor of the estate of Charles P. Steinmetz, deceased.*